A. G. WORMSER.
COMBINED LUNCH CARRIER AND HEATER.
APPLICATION FILED SEPT. 8, 1913.
1,106,176.  Patented Aug. 4, 1914.
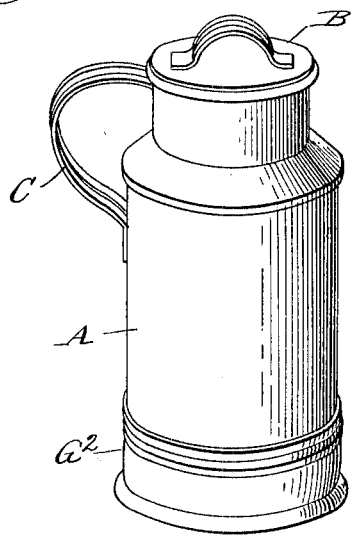
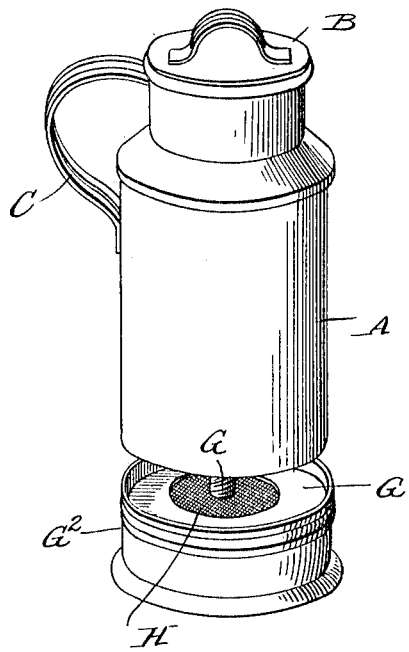
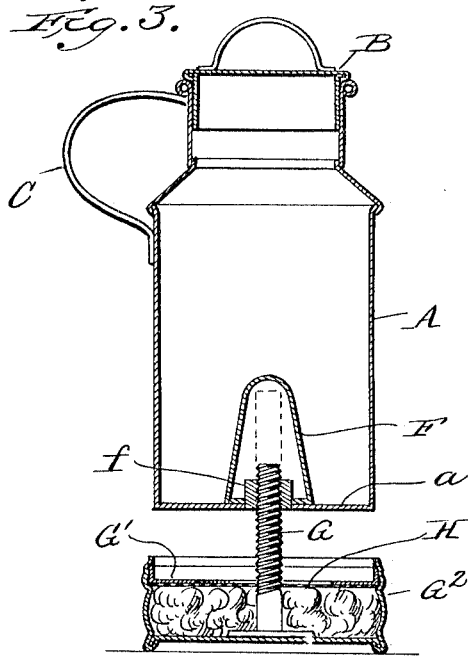
Witnesses
Philip E. Barnes
M. C. Smoot.
Inventor
Alfred G. Wormser
By Langdon Moore
Attorney

UNITED STATES PATENT OFFICE.

ALFRED G. WORMSER, OF HARRISBURG, PENNSYLVANIA.

COMBINED LUNCH CARRIER AND HEATER.

1,106,176.  Specification of Letters Patent.  Patented Aug. 4, 1914.

Application filed September 8, 1913. Serial No. 788,735.

*To all whom it may concern:*

Be it known that I, ALFRED G. WORMSER, a citizen of the United States, and resident of Harrisburg, in the county of Dauphin and State of Pennsylvania, have invented certain new and useful Improvements in Combined Lunch Carriers and Heaters; and I do hereby declare the following to be a full, clear, and exact description of the same, reference being had to the accompanying drawings, forming part of this specification, and to the figures and letters of reference marked thereon.

This invention relates to that class of domestic appliances adapted for holding food products, and particularly when prepared in the form of edibles to be consumed away from home, and adapted for heating the food products in a convenient and ready manner before the same are consumed.

The object of the invention is to provide a simple and convenient device which will resemble closely an ordinary receptacle in which food products for luncheon are carried and protected from contaminating influences, but which embodies a convenient arrangement of heating device so connected and associated therewith that its presence will not be apparent and it will in no wise interfere with the ordinary handling and manipulation of the container, and if desired may remain in place while the receptacle is being washed or cleaned.

The invention consists in certain novel details of construction and combinations and arrangements of parts, all as will be hereinafter described and pointed out particularly in the appended claims.

Referring to the accompanying drawings,—Figure 1 is a perspective view of the lunch carrier and heater embodying the present improvements. Fig. 2 is a similar view with the parts in the position to which they are moved when the heater is to be used for the purpose for which it is intended. Fig. 3 is a section in a vertical plane, showing the construction and relation of the parts.

Like letters of reference in the several figures indicate the same parts.

The containing vessel may be of any ordinary or preferred kind, that is to say, adapted for the reception of liquid or solid food products, but preferably embodies a bottom cylindrical portion indicated by the reference letter A in the accompanying drawing, a top or closure B, and a suitable handle such as C, whereby the vessel may be transported and handled either in carrying it from place to place or in using the receptacle after the manner of a cup or drinking vessel.

The bottom $a$ of the receptacle is preferably flat or provided with a smooth portion for a purpose to be presently explained, and centrally it is perforated and provided with an upwardly extending socket F which may be internally threaded at the lower portion, or, as shown, it may have secured within it by solder or otherwise a threaded nut or sleeve $f$ adapted for the reception of and coöperation with a threaded stem G which projects upwardly from a sub-base adapted to form the body of a lamp or heater which may thus be rotated to any desired position of adjustment with relation to the body of the container.

In the preferred construction the sub-base has a cylindrical peripheral wall $G^2$ ornamented by suitable beading as shown, and the peripheral wall extends upwardly above the top of the body of the lamp and is of a diameter to receive the lower end of the cylindrical portion of the body of the receptacle. The top G' of the lamp or sub-base forms an annular seat or ring against which the plane edge of the bottom of the container will seat, so as to effect a tight closure of the lamp body when it is out of operation, the closure being of such character that it may be made very tight due to the screw action of the stem connecting the parts. The body of the lamp is adapted to contain an absorbent material such, for example, as wick asbestos, which is usually retained therein by a gauze covering H, extending across the central opening of the annular top of the lamp body.

The screw stem may, of course, be secured within the lamp body in any suitable manner, as by soldering or otherwise, the prime object being to make a rigid connection whereby, when the parts are separated to the position shown in Fig. 2, the container will be supported firmly and the lamp may be left lighted, even though the container is being used for the time being as a drinking cup or receptacle from which the contents may be discharged by tipping the receptacle.

Of course, alcohol or other liquid fuel is to be placed in the lamp body and the receptacle is to be screwed down tightly thereon when the lamp is not in use, so as to prevent any evaporation or loss of the fuel and the screwing down of the receptacle will act as an extinguisher if the lamp is lighted.

By the employment of a relatively small central screw threaded stem the turning of the receptacle and lamp body with respect to each other so as to adjust them nearer to or farther from each other is comparatively easy, and there is little or no danger of the parts becoming stuck or inoperative. Furthermore, this construction avoids the necessity of employing any supporting standards around the lower edge of the receptacle, where the same would be subjected to heat and blackening flame, and thus insures a long life for the device as a whole.

When the container or receptacle and lamp are brought together, as shown in Fig. 1, the receptacle presents practically the appearance of a receptacle having no heating attachment, there being no external projections or parts to catch or be broken or destroyed by rough usage.

Having thus described my invention, what I claim as new and desire to secure by Letters Patent of the United States, is:

1. In a combined lunch carrier and heater, the combination with the container having a cylindrical body, closure and handle, and a central screw threaded socket in the bottom, opening downwardly, of a lamp body having a cylindrical wall adapted to receive the lower portion of the container, an annular top against which the bottom of the container seats to form a closure for the lamp body when not in use as a lamp, and a central screw threaded stem rigidly mounted in the lamp body and extending into the socket in the bottom of the container for adjustably connecting the parts with each other.

2. A combined lunch carrier and heater comprising in combination a container having a cylindrical body and a central screw threaded socket in the bottom, a lamp body having a cylindrical wall and annular top adapted to receive and seat the lower portion and bottom of the container, and a screw threaded stem rigidly mounted in the lamp body engaging the screw threaded socket for adjustably connecting the parts to support the container above the lamp when burning and to extinguish the lamp and seat the container when screwed home to prevent loss by evaporation of the fuel.

ALFRED G. WORMSER.

Witnesses:
   EMMA A. KEENY,
   ELMER E. ERB.

---

Copies of this patent may be obtained for five cents each, by addressing the "Commissioner of Patents, Washington, D. C."